US010022300B2

(12) United States Patent
Guala

(10) Patent No.: US 10,022,300 B2
(45) Date of Patent: Jul. 17, 2018

(54) VIAL ACCESS DEVICE

(71) Applicant: Industrie Borla S.p.A., Moncalieri (Turin) (IT)

(72) Inventor: Gianni Guala, Turin (IT)

(73) Assignee: INDUSTRIE BORLA S.P.A., Moncalieri (IT)

(*) Notice: Subject to any disclaimer, the term of this patent is extended or adjusted under 35 U.S.C. 154(b) by 301 days.

(21) Appl. No.: 14/894,689

(22) PCT Filed: May 29, 2014

(86) PCT No.: PCT/IB2014/061810
§ 371 (c)(1),
(2) Date: Nov. 30, 2015

(87) PCT Pub. No.: WO2014/191950
PCT Pub. Date: Dec. 4, 2014

(65) Prior Publication Data
US 2016/0101020 A1 Apr. 14, 2016

(30) Foreign Application Priority Data
May 29, 2013 (IT) .......................... TO2013A000432

(51) Int. Cl.
*A61M 5/32* (2006.01)
*A61J 1/20* (2006.01)
(Continued)

(52) U.S. Cl.
CPC ............. *A61J 1/201* (2015.05); *A61J 1/2048* (2015.05); *A61J 1/2096* (2013.01); *A61J 1/2055* (2015.05);
(Continued)

(58) Field of Classification Search
CPC ........ A61J 1/201; A61J 1/2048; A61J 1/2096; B29C 6/30325; B29C 6/30321; B29C 66/71; B29C 65/00; B21D 39/034
See application file for complete search history.

(56) References Cited

U.S. PATENT DOCUMENTS 4,124,676 A * 11/1978 Henzl ...................... B29C 33/50
249/127
6,514,593 B1 * 2/2003 Jones ...................... B29C 65/564
411/500
(Continued)

FOREIGN PATENT DOCUMENTS

CA 2813050 A1 4/2012
JP 2010-042527 A 2/2010
(Continued)

OTHER PUBLICATIONS

International Search Report for PCT Application No. PCT/IB2014/061810, dated Jul. 30, 2014.
(Continued)

*Primary Examiner* — Ariana Zimbouski
(74) *Attorney, Agent, or Firm* — Heslin Rothenberg Farley & Mesiti P.C.; Victor A. Cardona, Esq.

(57) ABSTRACT

A vial access device, includes a body having a projecting annular skirt that is elastically deformable, for engaging a complementary shaped neck of a vial. A tubular spike extends coaxially within the annular skirt for introducing into the vial, and a tubular connector protrudes from the body on the side opposite to the annular skirt and in fluid communication with the tubular spike. The tubular spike and the annular skirt are arranged, respectively, within a first and a second part, distinct from each other, and of which the first part is permanently joined to the body and the second part is connectable to the first part through an irreversible coupling.

5 Claims, 5 Drawing Sheets

(51) Int. Cl.
 *B29C 65/00* (2006.01)
 *B21D 39/03* (2006.01)
(52) U.S. Cl.
 CPC ............ *A61J 1/2072* (2015.05); *A61J 1/2075* (2015.05); *B21D 39/034* (2013.01); *B29C 65/00* (2013.01); *B29C 66/30321* (2013.01)

(56) References Cited

U.S. PATENT DOCUMENTS

| | | | |
|---|---|---|---|
| 7,743,799 | B2 | 6/2010 | Mosler et al. |
| 7,996,977 | B2 * | 8/2011 | Herb .................... B21D 39/034 29/432.2 |
| 8,998,875 | B2 | 4/2015 | Lev et al. |
| 2003/0070726 | A1 | 4/2003 | Andreasson et al. |
| 2010/0114058 | A1 * | 5/2010 | Weitzel ................ A61J 1/2096 604/411 |

FOREIGN PATENT DOCUMENTS

| | | |
|---|---|---|
| JP | 2013-506490 | 4/2011 |
| WO | 2011/039747 A1 | 4/2011 |
| WO | 2012/040799 A1 | 4/2012 |

OTHER PUBLICATIONS

1st Office Action dated Apr. 24, 2018 for corresponding Japanese Patent Application No. 2016-516291.
English Translation of Office Action Summery of 1st Office Action dated Apr. 24, 2018 for corresponding Japanese Patent Application No. 2016-516291.
English Translation of Notification of Reason(s) for Refusal of 1st Office Action dated Apr. 24, 2018 for corresponding Japanese Patent Application No. 2016-516291.

* cited by examiner

VIAL ACCESS DEVICE

CROSS REFERENCE TO RELATED APPLICATIONS

This application is a national stage filing under section 371 of International Application No. PCT/IB2014/061810, filed on May 29, 2014, and published in English on Dec. 4, 2014, as WO 2014/191950 A1, and claims priority of Italian application No. TO2013A000432 filed on May 29, 2013, the entire disclosure of these applications being hereby incorporated herein by reference.

FIELD OF THE INVENTION

The present invention relates to vial access devices, specifically to vials of liquid medicines containing toxic substances, for example, administered in chemotherapy treatments.

STATE OF THE PRIOR ART

From the U.S. patent U.S. Pat. No. 7,743,799, of which the Applicant is the holder, a known vial access device is configured to render this access safe for the operators, or rather to prevent medical personnel being exposed to the risk of inhalation of toxic substances contained in the vial when its content is mixed for being administered.

This known access device comprises a body having a projecting annular skirt that is elastically deformable for engaging the complementary shaped neck of a vial, and a tubular spike extending coaxially within said annular skirt for introducing into the vial. A tubular connector, able to be coupled with an extractor, formed, for example, by a syringe, projects from the body at the side opposite to the annular skirt, and in fluid communication with the tubular spike. The line of flow from the spike towards the tubular connector is also connected, typically via a non-return valve, to an expandable chamber, arranged to collect any toxic vapors, avoiding leakage outside the device.

In this known access device, the annular skirt with the spike and the tubular connector are formed in a single piece with the body, possibly also with a part of the expandable chamber, or the annular skirt and the spike are integrated in a separate piece, but still joined permanently to the body, which is, in turn, integrated with the tubular connector, and with part of the expandable chamber.

As the vials on the market have various configurations, particularly in relation to the diverse conformation and the different diameter of the relative neck, the annular skirt of the access device must obviously be differently configured to be able to be coupled with one type or with another, different type of vial. For this reason, it is necessary to make a multiplicity of access devices available, which differ from each other by a diverse conformation of the annular skirt, precisely shaped according to different forms, to be able to adapt to the diverse existing vials.

SUMMARY OF THE INVENTION

The object of the present invention is to overcome the aforesaid drawback, and to create an access device for vials of the type defined above, which allows unifying the manufacture of the major part of its components, however, making it easily adaptable to any type of vial present on the market.

In view of achieving this object, the invention relates to a vial access device of the type defined in the preamble of claim 1, whose unique characteristic lies in the fact that the spike and the annular skirt consist of a first and a second part, distinct from each other, of which the first part carries the spike and is joined permanently to the body of the device, and the second bears the annular skirt and is connectable to the first part by means of an irreversible coupling.

Thanks to this solution idea, the complex formed by the body of the device with the tubular connector, the possible expandable chamber part and the part with the spike can be joined, or rather suitable for all possible uses, while only the part with the annular skirt needs to be diversified in function of the different existing types of vials. After determining the type of vial for which the access device according to the invention is intended to be used, it is sufficient to select the suitable skirt for this type of vial, and then to attach the relative second part to the first part with the spike, or rather to the joined entire part, mentioned above.

The irreversible coupling between the part with the annular skirt and the part with the spike safely allows avoiding the risk that, in use, accidental removal of the vial from the device can occur, with the consequent possibility of environmental contamination with toxic substances.

This irreversible and therefore inviolable coupling between the part with the annular skirt and the part with the spike is advantageously mechanical, for example, formed by a non-disconnectable snap-fit engagement, but can be produced in a multiplicity of equivalent solutions as long as they are suitable to allow a simple and rapid mutual union, which is entirely reliable in terms of irreversibility.

BRIEF DESCRIPTION OF THE DRAWINGS

The invention will now be described in detail with reference to the accompanying drawings, provided purely by way of non-limiting example, in which.

DETAILED DESCRIPTION OF THE INVENTION

Figure 1:
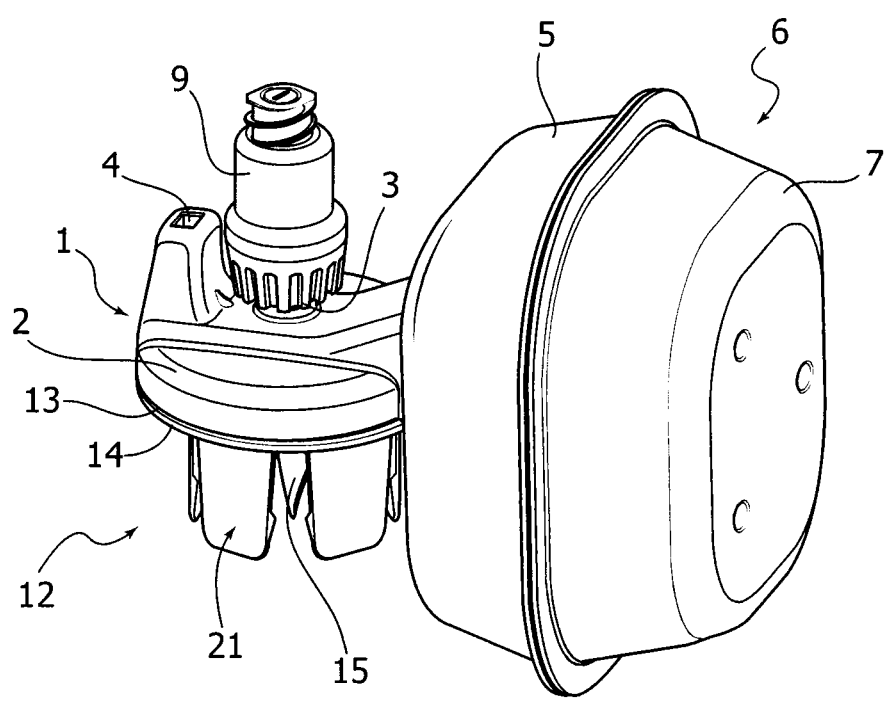
FIG. 1 is a schematic perspective view of a vial access device according to an embodiment of the invention.
Figure 2:
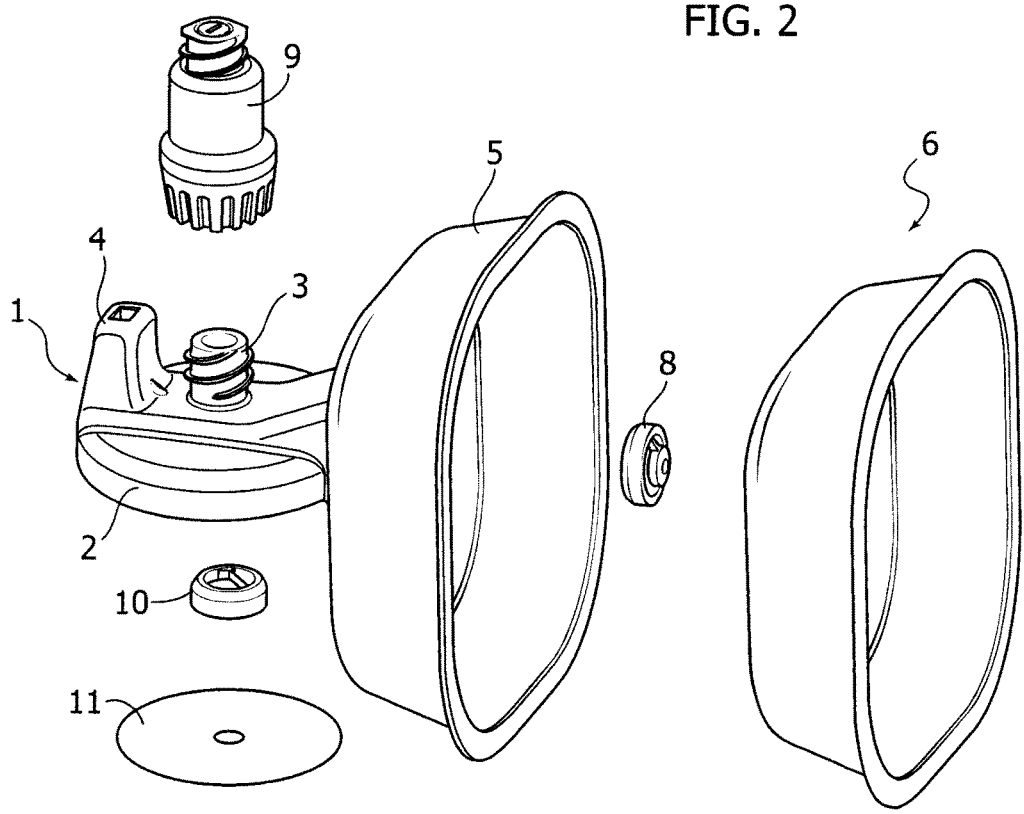
FIG. 2 is an exploded view of FIG. 1.
Figure 2:
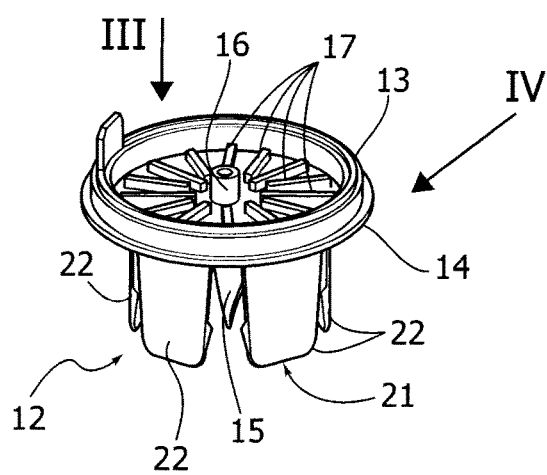
Figure 3:
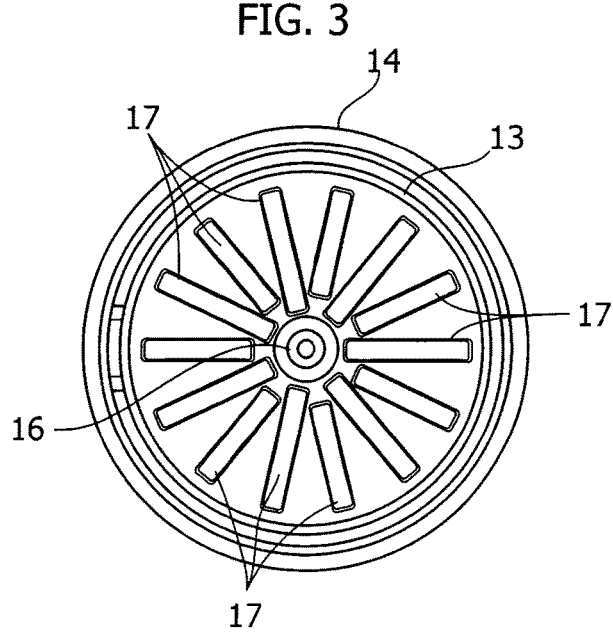
FIG. 3 is a top plan view on a larger scale according to the arrow III of FIG. 2.

Referring initially to FIG. 1, the vial access device according to a first embodiment of the invention essentially comprises a body generically indicated with 1, typically of moulded plastic material, formed in a single piece with the following components: a circular flange 2, a tubular connector 3 projecting from the side opposite to the flange 2, a gripping part 4 and a portion 5 of an expandable chamber 6, whose other portion 7 is represented in the expanded condition in FIG. 1.

The access to the expandable chamber 6 is controlled by a first one-way valve 8, while a second one-way valve 10 controls the communication with an aeration opening of the body 1.

In the case of the illustrated example, the tubular connector 3 is arranged for connection to a valve connector 9 of the known type per se, for example, of the type marketed by the Applicant under the name "B-Site", in turn configured for connection to an extractor fluid, formed, for, example by a syringe.

All the above-described components of the access device, as well as part of those that will now be described below, essentially correspond to those described and illustrated in the aforementioned U.S. patent U.S. Pat. No. 7,743,799.

A group, indicated as a whole with 12, is connected to the flange 2 of the body 1, on the opposite side to the tubular connector 3, and with the interposition of a membrane 11.

Figure 4:
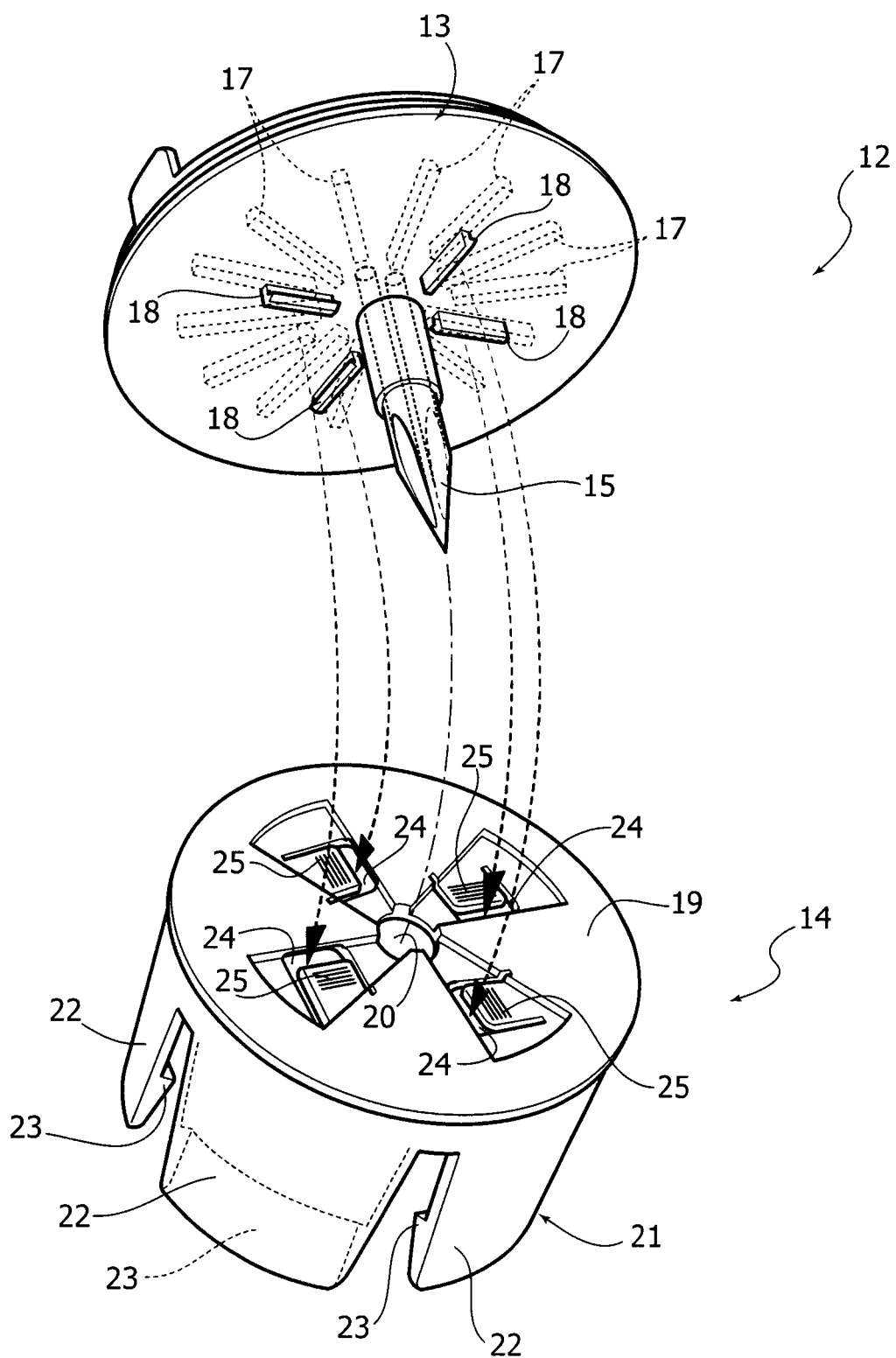
FIG. 4 is an exploded perspective view on a larger scale according to the arrow IV of FIG. 2.

The group 12, illustrated in greater detail in FIG. 4, comprises a first part 13 and a second part 14. The first part 13, of moulded plastic material, consists of a generally circular disc with a shape complementary to that of the flange 2 of the body 1, and permanently fixed to this flange 2. From the lower face of the disc 13, a tubular spike 15 centrally protrudes, in communication with a duct 16 protruding from the upper face of the disc 13 for communication with the tubular connector 3. The upper face of the disc 13 is formed, around the duct 16, from a radial pattern of projections 17 on which the filter 11 rests.

The opposite face of the disc 13, or rather that from which the tubular spike 15 projects, has a series (in the illustrated example, four in number) of tooth-like radial projections 18, whose function will be clarified below.

The second part 14 of the group 12 is formed from a distinct element that is separate from the part 13 and connectable thereto via an irreversible coupling. This characteristic allows, according to the invention, the easy adaptability of the vial access devices available today, having different configurations and sizes, without having to make available different entire corresponding access devices. The major part of the access device according to the invention, namely the body 1 with the tubular connector 3, the expandable chamber 5, the flange 2 and the spike tip 15, can thus be joined, and only the part 14 has to be arranged with different configurations that are selected in function of the different types of vials.

The part 14, also conveniently made in a single piece of plastic material, consists of a generally circular wall 19, complementary to that of the disc 13, having a central bore 20 and an annular side skirt 21.

The annular skirt 21 is formed from a series of sectors 22 designed to elastically spread apart, formed internally with respective engagement teeth 23 for engaging the complementary shaped neck of a vial.

Around the central bore 20, the wall 19 has a series (in the illustrated example, four in number) of apertures 24 within each of which a resiliently springing tab 25 projects, configured to cooperate in the manner clarified below, with a respective tooth projection 18 of the disc 13.

As explained above, the major part of the access device described above is produced in a joined manner, and its adaptation to the different types of available vials is achieved by the simple, irreversible coupling of the part 14 to the part 13. It is therefore evident that the part 14, and in particular the annular skirt 21, can be produced in a corresponding multiplicity of configurations and/or sizes, each suitable for connecting the access device to a corresponding type of vial.

For the coupling of the part 14 to part 13, the tubular spike 15 is simply inserted through the central bore 20 and the tooth-like projections 18 are angularly arranged at the apertures 24. Then, pushing the part 14 axially against the part 13 will snap-engage these tooth-like projections 18 below the resilient tabs 25, following the bending and the subsequent return of these into the undeformed condition.

Once the mutual coupling has been carried out as such, the part 14 can no longer be removed from the part 13.

Of course, the details of construction and the embodiments may vary widely with respect to those described and illustrated, without departing from the scope of the present invention as defined in the following claims.

In particular, the coupling system between the parts 13 and 14 can be achieved with different devices from those described with reference to the example illustrated, provided they are suitable for rapid and inviolable joining of the two parts. In particular, the snap-system described may be replaced by an interlocking or bayonet-type connection, irreversible in both cases.

Figure 5:
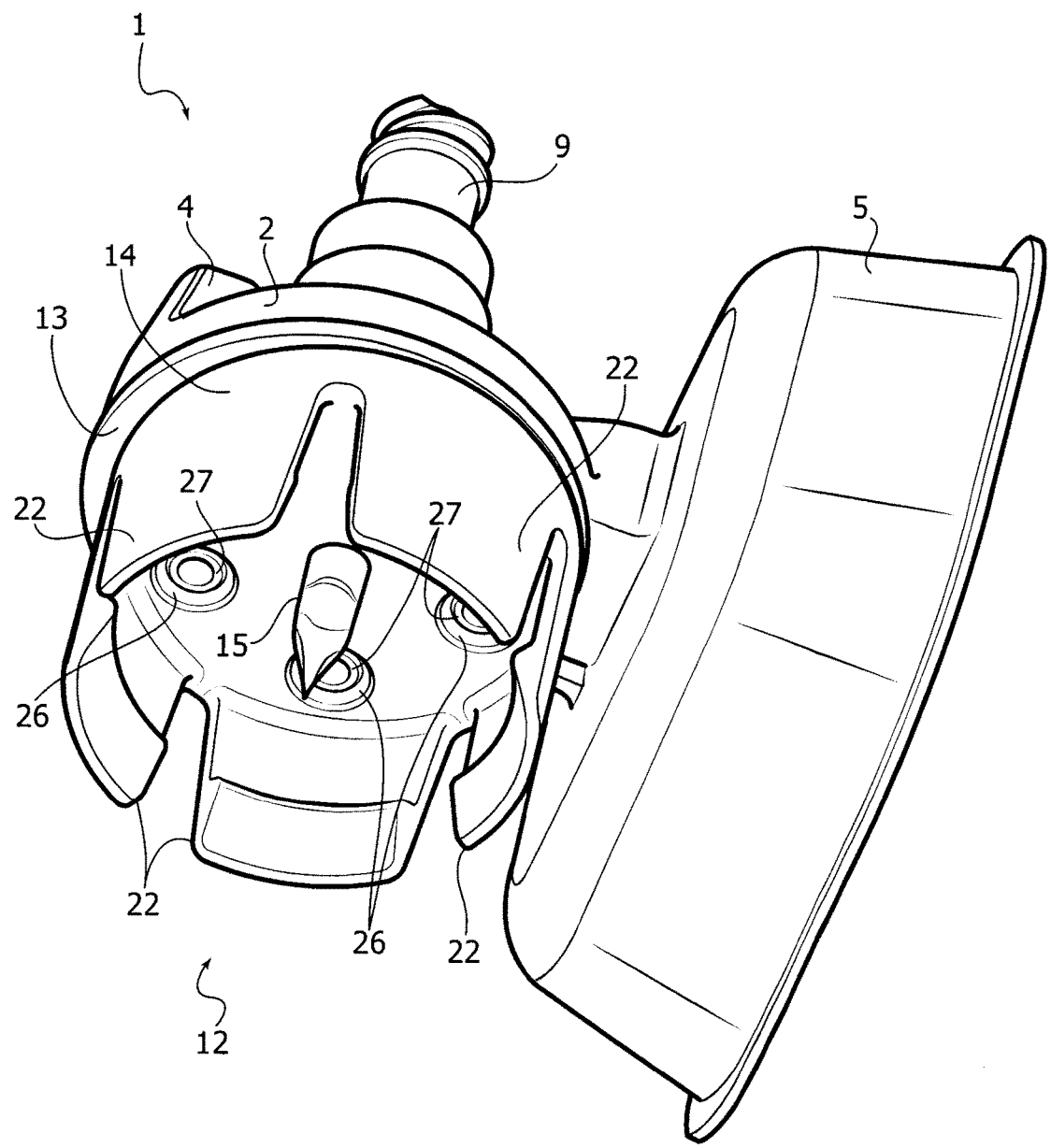
FIG. 5 is a schematic perspective view showing a variant of the vial access device according to the invention.
Figure 6:
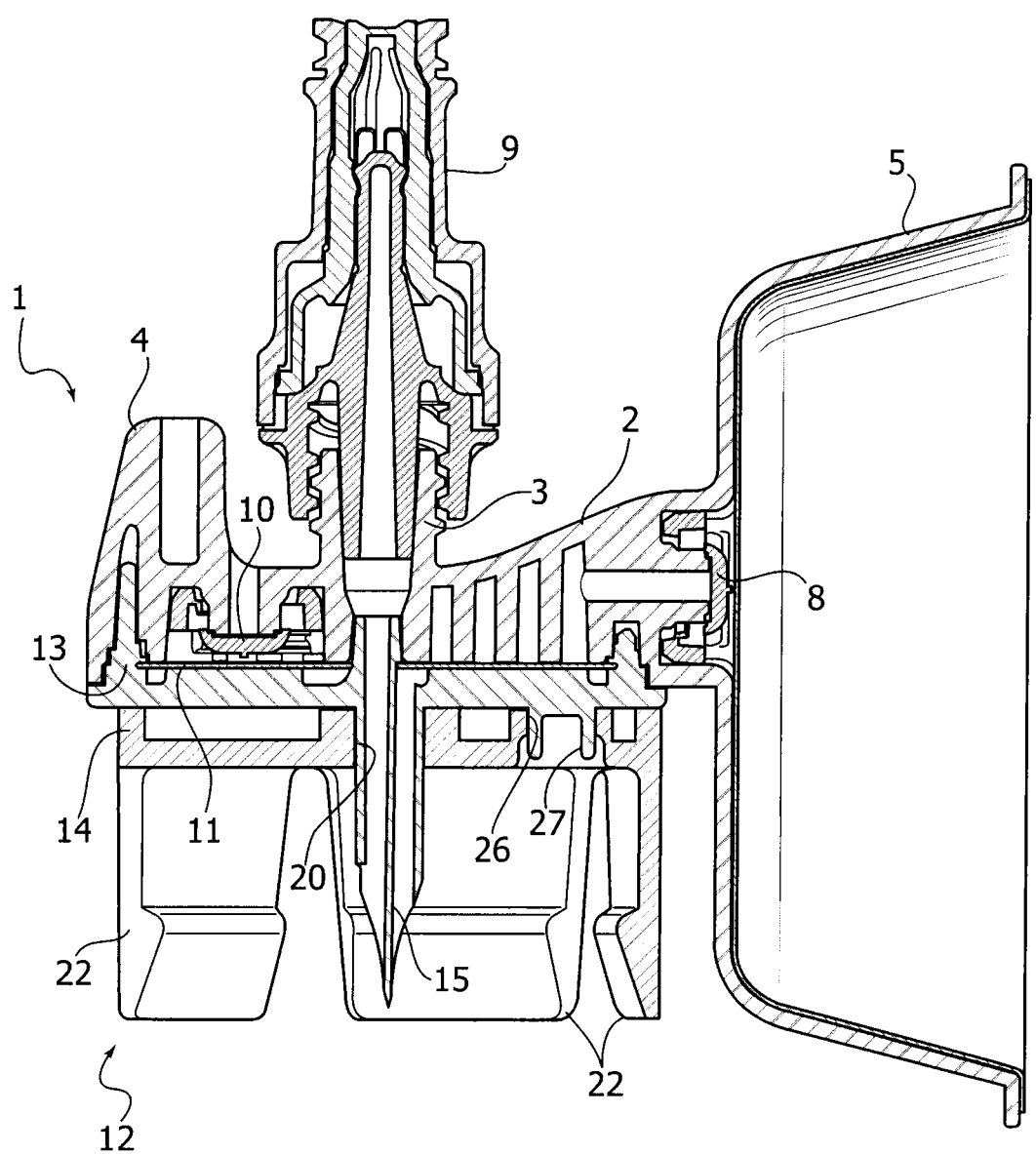
FIG. 6 is a vertical section of FIG. 5.

FIGS. 5 and 6 illustrate a variant of the rapid and irreversible coupling system between the parts 13 and 14, currently considered as the preferred embodiment.

According to this variant, wherein parts that are identical or similar to those already previously described, are indicated with the same reference numerals, the part 14 is formed with a crown of axial bores 26 and the part 13 has, concentrically to the spike 15, a corresponding crown of hollow axial projections 27 that are generally cylindrical in shape.

For their irreversible joining, the parts 13 and 14 become axially coupled to each other by introducing the hollow projections 27 through the bores 26, and then plastically deforming the ends of these projections 27, with the aid of heated punches introduced within them, in order to radially expand the ends against the edges of the respective bores 26, so as to irreversibly block them from a successive extraction.

The invention claimed is:

1. A vial access device, comprising:
a body having a projecting annular skirt that is elastically deformable, for engaging a complementary shaped neck of a vial,
a tubular spike extending coaxially within said annular skirt for introducing into the vial,
a tubular connector protruding from the body on the side opposite to said annular skirt and in fluid communication with said tubular spike,
the tubular spike and the annular skirt arranged, respectively, within a first and a second part, distinct from each other, and of which the first part bearing the tubular spike is permanently joined to said body and the second part bearing said annular-skirt, and
wherein the first part comprises a disc from which said tubular spike centrally projects, around which a crown of hollow axial projections is arranged, and the second part is formed with a crown of corresponding axial bores, ends of said hollow axial projections expanded against edges of said corresponding axial bores to to provide an irreversible coupling of said second part to said first part.

2. The vial access device of claim 1 wherein said skirt comprises a plurality of skirt sections circumferentially separated from each other.

3. The vial access device of claim 2 wherein plurality of skirt sections extend axially from an outermost circumferential portion of said disc.

4. The vial access device 1 wherein said ends of said hollow axial projections expanding against edges of said corresponding axial bores comprises said ends of said projections being plastically deformed by heated punches.

5. The vial access device of claim 1 wherein said hollow axial projections comprise cylindrically shaped projections having open ends on ends of said projections away from said tubular connector.

* * * * *